INVENTORS.
OTTO J. WINKELMAN
WILLIAM M. SWAN, JR. &
BY ALEXANDER G. HERRESHOFF

ATTORNEYS.

Aug. 25, 1959  O. J. WINKELMANN ET AL  2,900,835
MECHANICAL POWER STEERING MECHANISM
Filed July 27, 1953  4 Sheets-Sheet 3

INVENTORS
OTTO J. WINKELMAN,
WILLIAM M. SWAN, JR. &
BY ALEXANDER G. HERRESHOFF

ATTORNEYS

Aug. 25, 1959 O. J. WINKELMANN ET AL 2,900,835
MECHANICAL POWER STEERING MECHANISM
Filed July 27, 1953 4 Sheets-Sheet 4

INVENTORS
OTTO J. WINKELMANN,
WILLIAM M. SWAN, JR. &
BY ALEXANDER G. HERRESHOFF

ATTORNEYS.

United States Patent Office 2,900,835
Patented Aug. 25, 1959

2,900,835

MECHANICAL POWER STEERING MECHANISM

Otto J. Winkelmann, Berkley, and William M. Swan, Jr., and Alexander G. Herreshoff, Grosse Pointe, Mich., assignors to Chrysler Corporation, Highland Park, Mich., a corporation of Delaware Application July 27, 1953, Serial No. 370,524

7 Claims. (Cl. 74—388)

This invention relates to an automotive vehicle steering mechanism. More particularly, this invention relates to a power steering device for utilizing vehicle engine power to supplement a manual turning effort for controlling the vehicle.

The present power steering device, like other forms of power steering mechanisms which have been introduced into the public domain in the automotive field, is effective to multiply the manual turning torque applied to the vehicle steering gear the manual steering effort requirements and making possible a reduction in the overall reduction ratio and the number of steering wheel turns from lock to lock. This invention is unique, however, in that the power assist is obtained by means of a wholly mechanical "power take off" from the vehicle engine, is comparatively simple in design and has distinctive operating characteristics.

One of the several objects of the present invention is to provide a wholly mechanical automotive power steering unit which will enable the operator of the vehicle to experience a road "feel" or road "sense" while controlling the vehicle and which reduces the severity of road shocks and disturbances which are transmitted through the steering mechanism.

Another object of the present invention is to provide a wholly mechanical automotive power steering unit which will combine a manual turning effort with a power assist in such a manner that the driver is able to manually control the vehicle in the event of a mechanical failure in the power assist mechanism.

Another object of the present invention is to provide a wholly mechanical automotive power steering unit which combines a manual turning effort with a power assist and which incorporates an overload device for limiting the amount of the power assist to a predetermined maximum value as the amount of the manual turning effort is increased beyond a predetermined value.

Another object of the present invention is to provide a means for positively disengaging the power assist mechanism when the manual turning effort is discontinued thereby permitting the steering mechanism to return to the intermediate or "straight ahead" position.

Another object of the present invention is to provide a wholly mechanical automotive vehicle power steering unit which includes a means for transmitting power from the vehicle engine to the steering gear and which is adapted to compensate for the vibrational disturbances and the fore and aft displacement of the engine.

In general, the present embodiment of the invention comprises a drive shaft powered at one end by means of a belt drive from an engine crankshaft pulley. The other end of the drive shaft is drivably connected to one of three intermeshed power input pinions. Two sets of disc clutch plates are each adapted to be engaged by one of the input pinions and rotatably driven thereby. The steering worm is formed integrally with a cylinder which carries two sets of disc clutch plates for respectively cooperating and mating with the two sets of clutch plates engaged by the input pinions. The steering wheel column steering shaft is disposed concentrically with respect to the clutch plates and carries a cam element thereon which is adapted to engage a clutch actuating member. Upon rotary movement of the steering shaft, the cam element moves the clutch actuating member against the clutch plate assembly thereby causing a driving torque to be delivered from the input pinion to the steering worm. An overload device is associated with the cam element to limit the amount of engine torque which may be delivered through the clutch assembly. A return spring means is provided for disengaging the clutch assembly after the turning effort is reduced below a predetermined value. Should the power assist torque exceed the amount permitted by the overload device due to a very high manual turning effort upon the steering shaft, the excess manual turning torque is delivered directly to the steering worm through a loose spline connection provided for this purpose.

For the purpose of more clearly and concisely describing the present invention, reference will be made to the accompanying drawings in which:

Figure 5 is a view taken along the line 5—5 of Figure 2 showing the loose spline connection between the steering shaft and the steering worm;

Figure 6 is a view taken along the line 6—6 of Figure 2 showing the return spring in detail;

Figure 1:
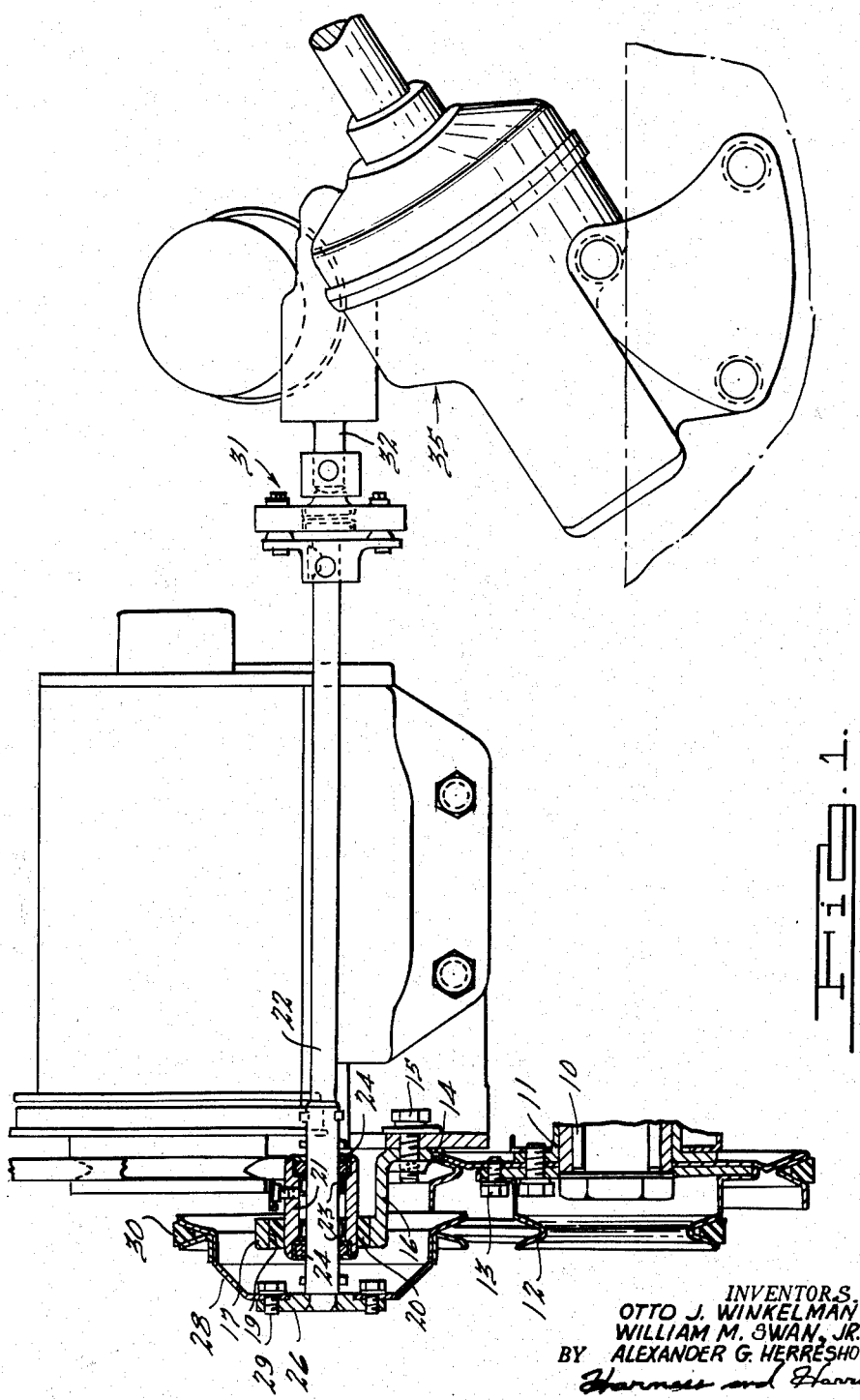
Figure 1 is a composite view of the power steering unit clutch housing, drive shaft, and the drive shaft belt driving mechanism.

Referring first to Figure 1, a portion of the vehicle engine crankshaft is shown at 10 upon which a flange 11 is drivably secured. A pulley 12 is secured to the flange 11 by means of bolts 13.

A bracket 14 is secured to a stationary structure on the engine such as the generator mounting, by means of bolts 15. The bracket 14 includes a forwardly extending cantilever portion 16 and an upright portion 17. The portion 17 is centrally apertured at 19 and has disposed therein an annular flexible bushing 20 within which a support member 21 is mounted. The drive shaft 22 is centrally and axially disposed within support member 21 and is rotatably mounted therein by means of needle bearings 23. Appropriate seals 24 are provided at each axial end of member 21 to contain bearing lubricant in the vicinity of the needle bearing 23.

A radial flange 26 is welded or otherwise secured to the extreme end of shaft 22, said flange 26 carrying a second pulley 28 by means of bolts 29. A belt 30 drivably connects the pulleys 28 and 12.

The other end of the drive shaft 22 is joined to a standard universal joint 31 which compensates for angular displacement of shaft 22 with respect to an input pinion drive shaft 32. The shaft 32 is received by the power steering clutch assembly housing which is shown generally at 35.

Figure 2:
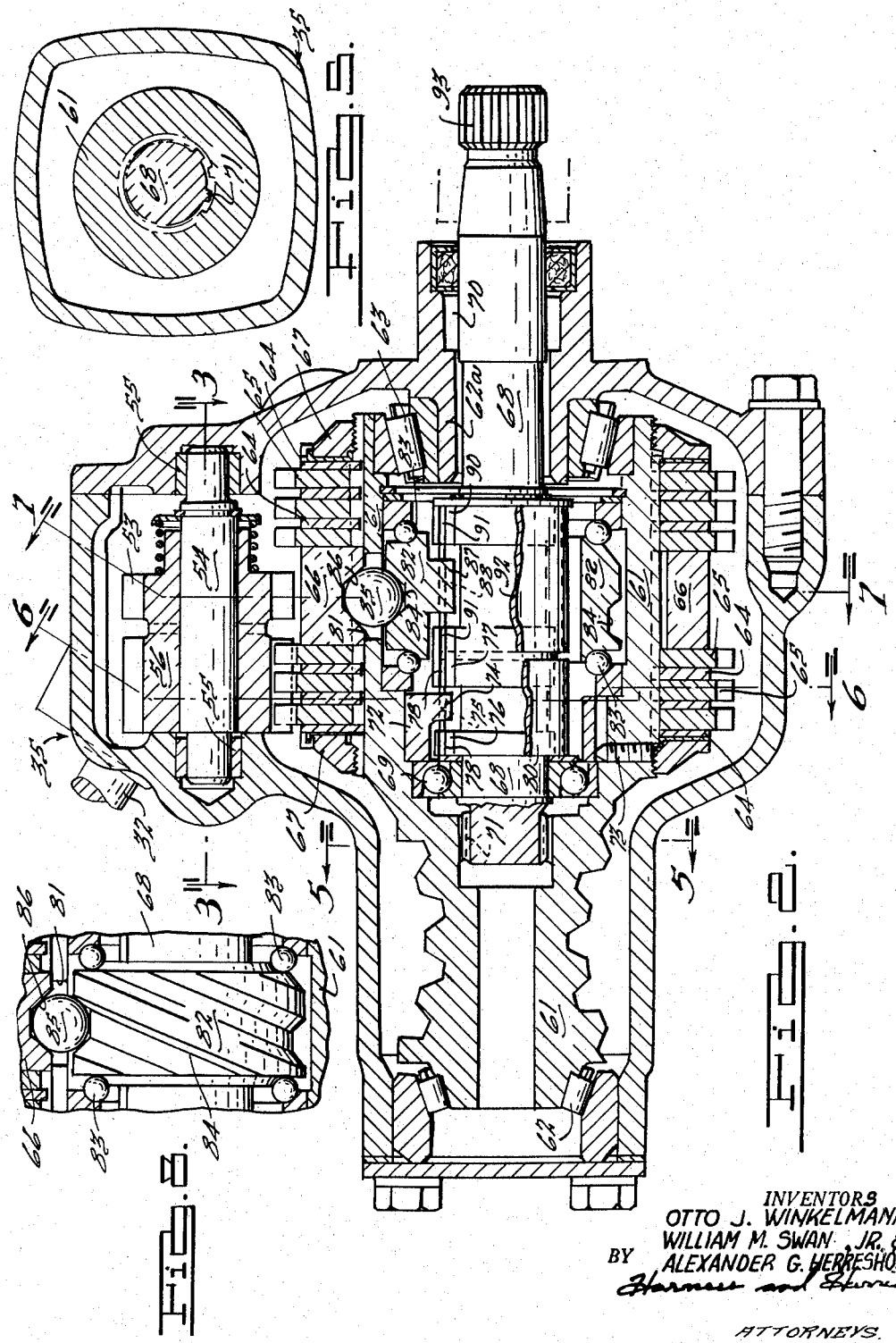
Figure 2 is a sectional view of the power steering unit clutch housing.
Figure 3:
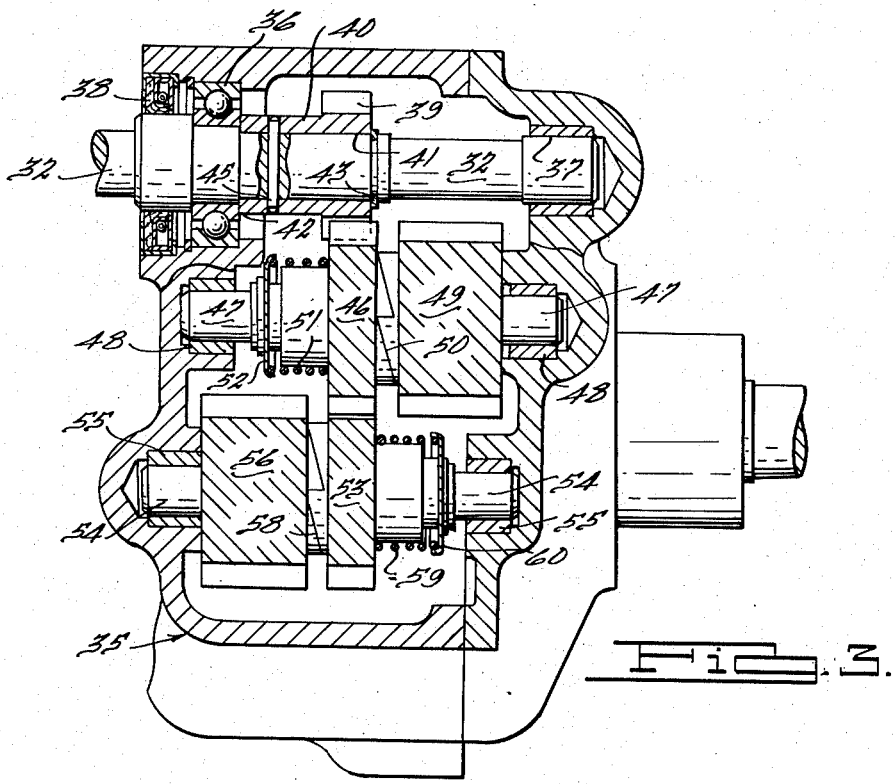
Figure 3 is a view taken along the line 3—3 of Figure 2 showing the power input pinions.
Figure 8:
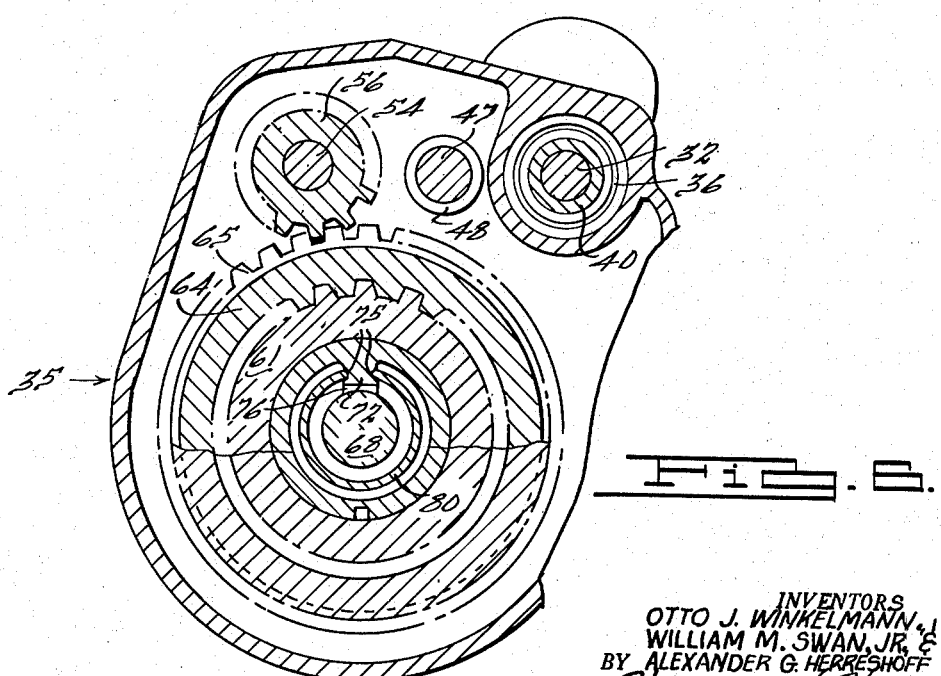
Figure 8 is a plan view of the cam element and follower shown in Figure 2.

Referring to Figures 2, 3, and 8, the clutch assembly is shown in more particular detail. The shaft 32, which is substantially concentric with respect to shaft 22, enters the housing 35 at an acute angle with respect to the centerline of the steering shaft and is mounted at two points in spaced bearings 36 and 37. A suitable seal is provided at 38.

An input pinion 39 having a hub extension 40 extending axially therefrom, is centrally bored at 41 and receives therethrough the shaft 32. Axial movement of the pinion 39 upon shaft 32 is prevented by a shoulder 42 and a snap ring 43 on the shaft 32. A suitable shear pin 45 is adapted to prevent relative rotation between the hub 40 and shaft 32 but is designed to shear when the driving torque through the shaft 32 exceeds a predetermined value.

A second input pinion 46 is rotatably mounted upon a shaft which is mounted within housing 35 at either end by means of bearings 48. Shafts 32 and 47 are disposed at an angle with respect to each other because of the relative positions of the power input source and the housing 35. The gears 39 and 46 have crossed axes and are each provided with helical gear teeth which are drivably engaged. A spur gear 49 is fixedly secured to the shaft 47 and is adapted to drivably engage one of two sets of disc clutches which will be described subsequently. The adjacent hub portion of gears 46 and 49 are formed with one-way ratchet teeth 50 thereon thus providing a one-way power drive between shafts 32 and 47. The teeth 50 are held in driving engagement by means of a spring 51 which is interposed between a shoulder 52 formed on shaft 47 and the gear 46 said spring 51 being effective to bias the gear 46 axially on shaft 47.

The gear 46 is also in driving engagement with another helical gear 53 which is rotatably mounted on a shaft 54 mounted in housing 35 by means of bearings 55 at either end of shaft 54. Shaft 54 is parallel to shaft 47 and has fixedly secured thereon a spur gear 56. The adjacent hub portions of gears 53 and 56 are provided with interengaged one-way ratchet teeth 58. A spring 59 is interposed between a shoulder 60 formed on shaft 54 and the gear 53 for biasing the ratchet teeth on the latter against the ratchet teeth on the gear 56.

A steering worm member 61 is mounted within the housing 35 upon roller bearings 62 and 63 at either end thereof and on an axis parallel to the shafts 54 and 47. As seen in Figure 2, the worm member 61 comprises a worm at one end thereof and a cylindrical portion at the opposite end. The housing 35 is provided with an extended portion 62a to serve as a support for the bearing 63.

The cylindrical portion of member 61 is externally splined and carries thereon a series of multiple clutch discs 64 which are formed with mating internal splines.

A second series of multiple clutch discs 65 are carried by the cylindrical portion of member 61 and are adapted to float freely thereon. The outer periphery of the discs 65 are provided with teeth as shown.

The multiple clutch discs 64 and 65 are separated into two assemblies by a clutch actuating member 66 which comprises a ring internally splined to the cylindrical portion of worm member 61. The discs 64 and 65 are alternately positioned in each of the two assemblies and are adapted to be moved axially into mating frictional engagement by the clutch actuating member 66. Clutch disc back-up rings 67 are provided on either end of the cylindrical portion of worm member 61 to oppose the axial thrust being exerted upon either multiple disc clutch assemblies by the clutch actuator plate 66.

The spur gear 56 is drivably engaged with the external teeth on the clutch discs 65 of one assembly and the spur gear 49 is engaged with the external teeth on the clutch discs 65 of the other assembly. It is thus seen that the torque delivered to the interengaged input pinions 39, 46, and 53 is alternately transmitted to the member 61 through either one or the other of the clutch disc assemblies depending upon the axial direction of movement of the actuator member 66. Since the direction of rotation of gear 49 is opposite from that of gear 56, the direction of the torsional moment applied to member 61 when the actuator member is moved in one direction is opposite from that which is applied when the actuator member is moved in the other direction. Only one clutch assembly may be energized at any one time. The clutch plates of the assembly which is not energized merely overrun with respect to each other.

The steering shaft has an axially extending portion 68 which is mounted within the cylindrical portion of member 61 and supported by axially spaced bearings 69 and 70 which in turn are mounted in the member 61 and housing 35 respectively.

The end of shaft 68 is formed with spline teeth at 71 which loosely engage mating spline teeth formed in the member 61, as seen in Figures 2 and 5. The backlash at this spline connection is purposely made sufficiently large so as to allow approximately 10 degrees of relative rotary movement between shaft 68 and member 61.

As seen in Figures 2 and 6, an annular insert 72 is fixed within a mating counterbore in the member 61 and held therein by means of a set screw 73. An inwardly extending finger 74 is formed on the insert 72 and is provided with axially extending grooves 75 on either side thereof.

The shaft 68 is provided with finger portions 76 and 77 formed integrally thereon which are spaced axially and situated on either side of the finger 74. Axial grooves 78 are formed on either side of the fingers 76 and 77. A return clip spring 80 is adapted to surround the shaft 68 and to be seated in grooves 75 and 78 thereby providing a resilient connection between shaft 68 and member 61. The position of the fingers 74, 76 and 77 with respect to the spline teeth at 71 is such that the mating spline teeth are in the disengaged or intermediate position, as seen in Figure 5, when the grooves 75 and 78 are in axial alignment. When a predetermined torque is applied to shaft 68, the clip spring 80 will deflect thus allowing fingers 76 and 77 to become displaced with respect to finger 74. The loose spline engagement at 71 will permit relative rotation between shaft 68 and member 61 up to 5 degrees in either direction depending upon the direction of the applied torque.

The cylindrical portion of member 61 is provided with a series of spaced holes 81 about the periphery thereof which are axially positioned so as to be surrounded by the actuator plate 66. A cam element 82 is rotatably mounted by means of bearings 83 inside the cylindrical portion of member 61 and is axially positioned directly under the holes 81.

As seen in Figures 2 and 8, the element 82 is provided with cam grooves 84 about the periphery thereof. Ball cam followers 85 are disposed in each of the holes 81 and are adapted to ride within the grooves 84. The actuator member 66 is provided with suitable recesses 86 for receiving the ball cam follower 85. The holes 81 are sufficiently large so as to permit axial motion of the follower 85 in either direction. Upon a rotary motion of the cam element 82 about its geometric axis, the cam follower 85 is effective to transmit an axial motion in either direction to the actuator member 66 which is slidably splined to member 61.

The element 82 is centrally bored and has a finger 87 extending radially inward, said finger 87 being formed with axially extending grooves 88 on either side thereof.

Figure 7:
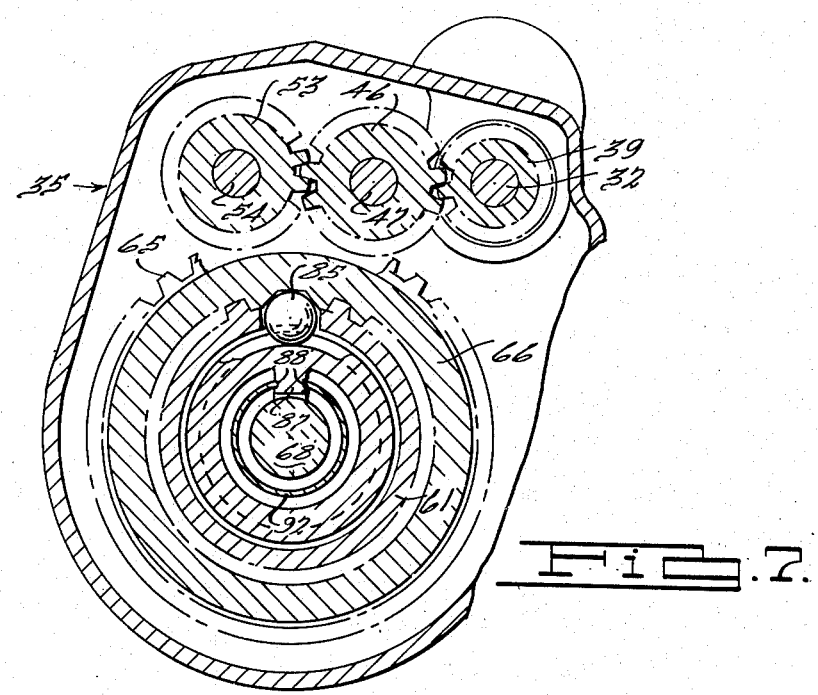
Figure 7 is a view taken along line 7—7 of Figure 2 showing the power assisit overload limit means.

The finger 87 is interposed between finger 77 and a third axially spaced finger 90 on shaft 68. Axially extending grooves 91 are formed on either side of fingers 77 and 90. As seen in Figures 2 and 7, an overload clip spring 92 is adapted to surround shaft 68 and engage the grooves 88 and 91 thereby providing a resilient connection between shaft 68 and element 82. The torque applied to shaft 68 is therefore transmitted through the clip spring 92 to element 87 which in turn causes the actuator member 66 to move axially.

Figure 4:
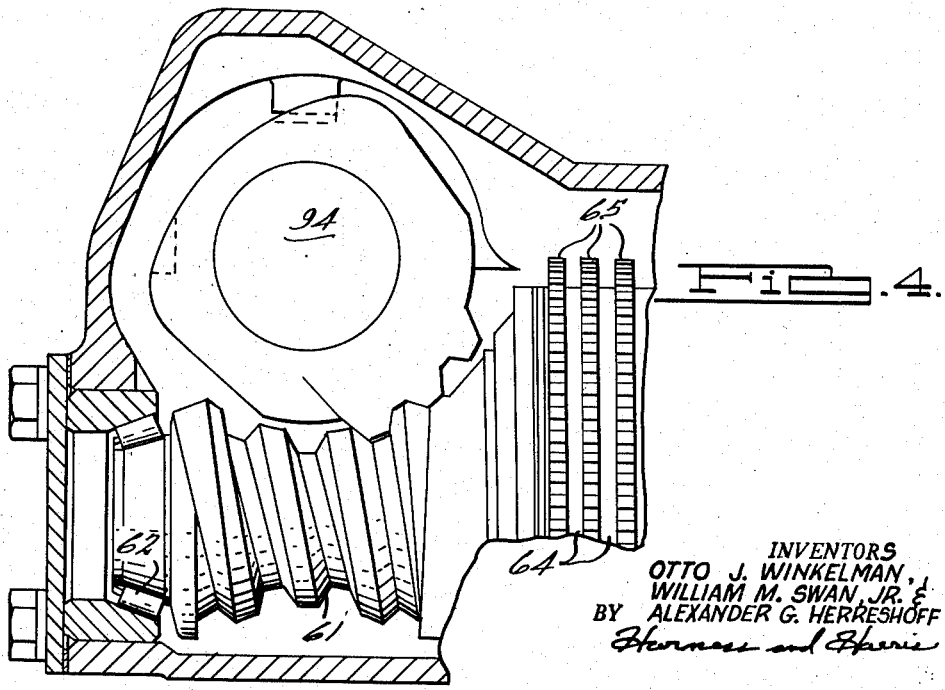
Figure 4 is a view, partly in section, showing the steering worm and worm gear.

One end of shaft 68 is splined at 93 to the steering shaft of the vehicle thereby providing for the delivery of a manual turning effort to the worm gear 94, as seen in Figure 4, to supplement the power assist. The worm gear is in turn interconnected with the vehicle steering mechanism.

The operation of this invention is as follows. Engine power is delivered from the engine crankshaft pulley 12 to the drive shaft pulley 28 by means of belt 30. The engine power is transmitted to the input pinion drive shaft 32 by means of drive shaft 22 and the universal joint 31. Because of the flexible engine mountings, a certain amount of fore and aft displacement of the support bracket 14 and support member 21 with respect to the vehicle frame will take place during the operation of the vehicle. To compensate for this displacement, the needle bearings 23 are adapted to allow relative sliding movement between shaft 22 and member 21. The universal joint 31 is effective to compensate for angular misalignment of shafts 22 and 32.

The input power transmitted to shaft 32 causes the interengaged gears 39, 46, and 53 to rotate. The ratchet teeth 50 and 58 are effective to transmit driving torque to the spur gears 49 and 56 respectively. The rotation of gear 56 causes the clutch discs 65 of one clutch assembly to rotate in one direction and the rotation of gear 49 causes the clutch discs 65 of the other assembly to rotate in the opposite direction.

When a manual turning effort is applied to shaft 68 in excess of a predetermined amount, the centering clip spring 80 is deflected thus permitting relative rotation between shaft 68 and member 61. The instant this relative rotation takes place, the cam element 82 is rotated by virtue of the resilient connection with shaft 68 provided by spring 92. The rotation of cam element 82 causes the ball followers 85 to ride within their associated cam grooves and to thereby shift the actuator member 66 axially to energize one of the multiple disc clutch assemblies. The energized clutch assembly is then effective to transfer driving torque from the associated spur gear, either 49 or 56, to the member 61 thereby imparting a turning torque to the steering worm gear 94.

It should be noted that one clutch assembly will be energized upon rotation of the cam element 87 in one direction and the other clutch assembly will be energized upon rotation of element 82 in the opposite direction. An increase in the turning effort will result in an increase in the axial pressure applied by the actuator member 66 to the clutch discs. The magnitude of the power assist will, therefore, be proportional to the turning effort.

When the manual turning effort ceases, the centering spring 80 is effective to disengage the energized clutch thereby relieving the power assist. If the vehicle is maneuvering in a fixed turn, the steering wheel may be held in one position while both of the clutch assemblies are overrunning and inoperative.

The centering spring 80 is so calibrated that relative rotation between shaft 68 and member 61 may take place only if the turning effort exceeds a predetermined minimum value, such as 18 lb.-inches. When a greater turning effort is applied, the centering spring 80 is deflected until the turning effort is reduced below that value. If the turning effort ceases entirely, the steering mechanism will be returned to the forward or intermediate position in the usual manner by virtue of the characteristics of the vehicle wheel suspension.

If a turning effort in excess of a predetermined maximum value is applied to the shaft 68, the overload spring 92 will deflect thus allowing relative rotation between shaft 68 and cam element 82. A torque of approximately 70 lb.-inches, for example, would be an appropriate value for the manually applied turning effort at which the overload spring would be caused to deflect. Thus the axial pressure which may be applied to either of the multiple clutch assemblies is limited to a predetermined value. If the manual turning effort is increased beyond 70 lb.-inches, the springs 92 and 80 will deflect until the backlash at the spline connection 71 is taken up thereby providing a positive engagement between shaft 68 and member 61. Thereafter, the manually applied torque being exerted on shaft 68 is transferred directly to member 61 through the spline connection 71.

If a turning effort is applied to the shaft 68 when the vehicle engine is not operating, then the torque will be transferred from shaft 68 to clutch plate 66 and then directly into the member 61 through the energized clutch assembly, but no power assist will be obtained from the associated spur gear 56 or 49. Under these conditions the clutch discs 65 drive their associated spur gear, which is the reverse of the normal operation wherein the spur gears drive the clutch discs. The spur gears 56 and 49 are allowed to freely rotate when they are driven by their associated clutch disc assemblies by virtue of the ratchet teeth 58 and 50 respectively. The ratchet teeth 58 will serve to cause spur gear 56 to overrun when the vehicle wheels are manually turned in one direction when the engine is not running, and the ratchet teeth 50 will serve to cause spur gear 49 to overrun if the wheels are manually turned in the other direction.

The ratchets 50 and 58 also serve a useful purpose in the event that one of the multiple disc clutch assemblies becomes locked or frozen. Since only one of the clutch assemblies may be energized by the actuator member 66 at any one time, it is quite probable that the two assemblies will not freeze at the same instant. Therefore, assuming that one of the assemblies fails during a turning operation and becomes locked up, the other clutch assembly will be energized when the steering wheel is turned by the operator in the other direction. This will result in a torque being delivered to the member 61 through both clutch assemblies simultaneously in opposite directions, the torque through the respective clutch assemblies tending to oppose each other. Consequently, the torque requirements from the engine for the power assist are doubled. This increase in torque being delivered to the pinion input shaft 32 will cause shear pin 45 to fail which cuts off the power assist entirely. Thereafter, the operator of the vehicle will be able to control the vehicle manually while the spur gears 56 and 49 are allowed to freely overrun by virtue of the ratchet teeth 58 and 50 respectively. After the shear pin 45 fails, the manual turning effort may be applied in either direction through the respective clutch assemblies to the member 61.

If the cam element 82, the spring 92 or the ball follower 85 should fail during the operation of the vehicle, the operator may still retain control over the vehicle by virtue of the loose spline connection between shaft 68 and member 61.

The unitary construction of the member 61 is a feature of considerable significance in that the unit is thereby more easily assemblied and has a greater torque capacity. Also, since the spur gears 49 and 56 directly engage the multiple disc clutch assemblies, the need for a ring gear or cage member around the clutch discs is eliminated.

It should be observed that the amount of the power assist obtained from the vehicle is proportional to the axial force exerted on the clutch assemblies by the actuator member and hence is proportional to the manual turning effort. This results in a so-called "road feel" which enables the operator to retain more positive control over the vehicle during turning maneuvers. During normal straight ahead driving, the steering gear may be controlled entirely manually since the torque required to deflect spring 80 may not exceed the predetermined minimum of 18 lb.-inches.

It is desirable to design the multiple disc clutch assemblies to provide a power assist of approximately 80 percent of the total steering effort. If the manual component of the steering effort exceeds approximately 70 lb.-inches, the power assist will remain at a constant value of approximately 350 lb.-inches due to the operation of the overload spring 92 thereby preventing permanent damage due to the over-stressing of the steering mechanism.

While a certain preferred embodiment of the invention has been specifically disclosed, it is understood that the invention is not limited thereto as many variations will be readily apparent to those skilled in the art and the invention is to be given its broadest possible interpretation within the terms of the following claims.

What we claim is:

1. A power boosting mechanism including a driven member, a manually operated driving member, multiple disc clutch means carried by said driven member having a cylindrical portion, a power shaft, gearing drivably interconnecting said power shaft and said multiple disc clutch means, an actuating member for energizing said multiple disc clutch means, a cam element mounted within said cylindrical portion, a cam follower element interconnecting said cam element and said actuating member whereby the manual effort applied to said driving member is effective to proportionately energize said multiple disc clutch means to permit the transfer of power from said power shaft therethrough to said driven member at a rate which is proportional to the manual effort, a loose spline connection between said driving and driven members enabling limited relative rotary movement between the latter members, and overload spring means resiliently connecting said cam element and said driving member for yieldingly opposing relative rotary movement between said driving member and cam element throughout the extent of movement enabled by said loose spline connection.

2. A power booster mechanism comprising a driven member having a cylindrical portion integrally formed thereon, a manually operated driving member axially disposed in said cylindrical portion having formed thereon a projection extending radially outward, another projection formed within said cylindrical portion extending radially inward in close proximity to said first-named projection, a clip spring resiliently connecting said projection thereby biasing said driven and said driving member toward a central relative angular position, a power shaft, clutch means carried by said cylindrical portion, comprising axially spaced clutch plates splined to said cylindrical portion and spaced by other clutch plates rotatable on said cylindrical portion and having coaxially arranged gear teeth, said clutch plates being shiftable axially into mutually engaging clutch action an axially movable clutch actuator slidably carried by said cylindrical portion adjacent said clutch means, gearing interconnecting said power shaft and said gear teeth to rotate said other clutch plates, a cam element carried by said driving member, and an axially movable cam follower drivably connecting said cam element and said clutch actuator for energizing said clutch means upon rotation of said driving member with respect to said driven member against the centering force of said clip spring.

3. A power steering mechanism for use in controlling the steering gear of a wheeled engine powered vehicle comprising a manually actuated steering shaft, a driven member disposed concentrically with respect to said steering shaft, said steering shaft having an externally splined portion, said driven member having an internally splined portion, said splined portions forming a lost motion connection between said steering shaft and said driven member, multiple disc clutches carried by said driven member including driven discs splined on said driven member and also including driving discs rotatable on said driven member and having external gear teeth about the periphery thereof, a vehicle engine powered drive shaft, gearing interconnecting said multiple disc clutches and said drive shaft including idler pinions directly intermeshed with the teeth of said driving discs, and cam means interconnecting said steering shaft and said multiple disc clutches for energizing said clutches to transmit vehicle engine power therethrough to said driven members upon actuation of said steering shaft.

4. A power boosting mechanism as set forth in claim 1 wherein said overload spring means comprises a radially depending portion formed on said cam element, at least one radially extending projection formed on said driving member, and a clip spring surrounding said driving member and resiliently engaging said depending portion and said projection.

5. A power boosting mechanism including a driven member having a cylindrical portion, a manually operated driving member, clutch means carried by said driven member, a power shaft, gearing drivably interconnecting said power shaft and said clutch means, an actuating member for energizing said clutch means, a cam element mounted within said cylindrical portion, a cam follower interconnecting said cam element and actuating member whereby the manual effort applied to said driving member is effective to proportionately energize said clutch means to permit the transfer of power from said power shaft therethrough to said driven member at a rate which is proportional to the manual effort, a loose spline connection between said driving and driven members enabling limited relative rotary movement between the latter members, and overload spring means resiliently connecting said cam element and said driving member for yieldingly opposing relative rotary movement between said driving member and cam element throughout the extent of movement enabled by said lost motion connection.

6. A power boosting mechanism according to claim 5 wherein said cylindrical portion is hollow and is formed integrally with said driven member, said driving member is axally disposed within the hollow cylindrical portion, said clutch means is arranged around the outer periphery of said cylindrical portion, said actuating member is slidably carried by said cylindrical portion, and said cam element is arranged around said driving shaft.

7. A power boosting mechanism according to claim 1 wherein said cylindrical portion is hollow and said driving member is arranged coaxially within said cylindrical portion, said clutch means comprises a pair of clutch disc assemblies carried by said cylindrical portion and axially spaced with respect to each other, each disc assembly having clutch discs splined on said cylindrical portion and spaced by other clutch discs rotatable coaxially on said cylindrical portion and having coaxially arranged gear teeth, said clutch discs of each assembly being shiftable axially into mutually engaging clutch action, said gear interconnecting said power shaft and clutch means includes a power input pinion rotatably carried by said power shaft, a power input pinion rotatably carried by said power shaft, a first idler pinion drivably connected to said input pinion, a second idler pinion drivably connected to said first idler pinion, the gear teeth of the discs of one of said clutch assemblies being drivably engaged with said first idler pinion and the gear teeth of the discs of the other clutch assembly being drivably engaged with the second idler pinion, whereby said clutch assemblies are effective to selectively deliver steering torque to said driven member in either direction in response to a manual effort exerted upon said driving shaft, said actuating member is slidable axially on said cylindrical portion between said clutch assemblies, said cam element is arranged around said driving member, and said cam follower is shiftable axially to effect axial sliding movement of said actuating member.

References Cited in the file of this patent

UNITED STATES PATENTS

| Re. 23,692 | Vickers | Aug. 4, 1953 |
| 2,744,415 | Gaubatz | May 8, 1956 |
| 2,775,133 | Armantrout | Dec. 25, 1956 |

FOREIGN PATENTS

| 572,934 | Great Britain | Oct. 30, 1945 |

UNITED STATES PATENT OFFICE
CERTIFICATE OF CORRECTION

Patent No. 2,900,835                          August 25, 1959

Otto J. Winkelmann et al.

It is hereby certified that error appears in the printed specification of the above numbered patent requiring correction and that the said Letters Patent should read as corrected below.

Column 1, line 23, after "gear" insert -- thereby reducing --; column 4, line 46, for "b ythe" read -- by the --; column 6, line 56, for "assemblied" read -- assembled --; column 7, line 12, after "member", first occurrence, insert -- having a cylindrical portion --; lines 13 and 14, strike out "having a cylindrical portion"; line 41, for the syllable "jection" read -- jections -- line 48, after "action" insert a comma.

Signed and sealed this 15th day of March 1960.

(SEAL)

Attest:

KARL H. AXLINE
Attesting Officer

ROBERT C. WATSON
Commissioner of Patents